Dec. 9, 1969  T. H. WOOD  3,483,351
ROTATING REEL FOR ELECTRICALLY COUPLING TO A ROTATING
MEMBER IN A VACUUM CHAMBER
Filed June 8, 1967  5 Sheets-Sheet 1

INVENTOR.
THEODORE H. WOOD
BY Louis Reens
ATTORNEY

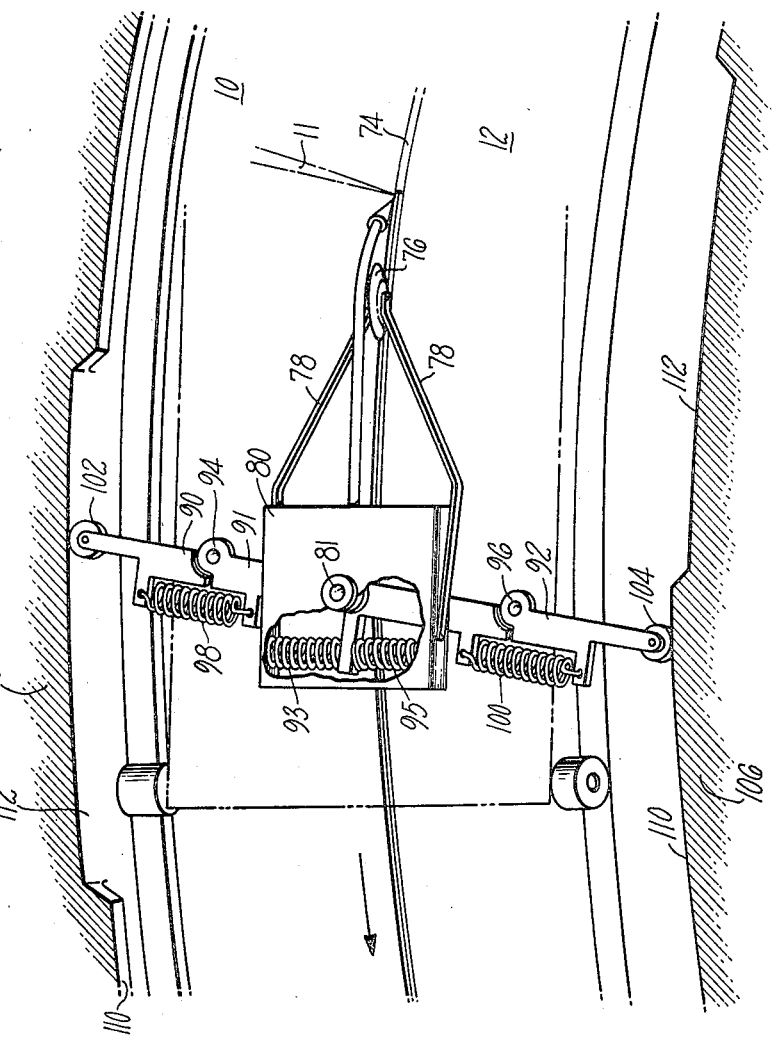
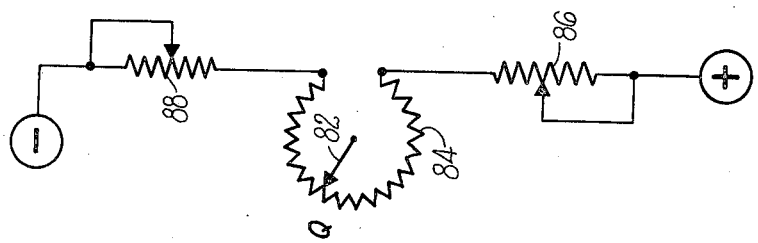
FIG. 4
FIG. 4A

Dec. 9, 1969 T. H. WOOD 3,483,351
ROTATING REEL FOR ELECTRICALLY COUPLING TO A ROTATING
MEMBER IN A VACUUM CHAMBER
Filed June 8, 1967 5 Sheets-Sheet 4

# United States Patent Office 3,483,351
Patented Dec. 9, 1969

3,483,351
ROTATING REEL FOR ELECTRICALLY COUPLING TO A ROTATING MEMBER IN A VACUUM CHAMBER
Theodore H. Wood, Vernon, Conn., assignor to United Aircraft Corporation, East Hartford, Conn., a corporation of Delaware
Filed June 8, 1967, Ser. No. 644,541
Int. Cl. B23k 9/00, 9/02
U.S. Cl. 219—121                5 Claims

ABSTRACT OF THE DISCLOSURE

An electron beam pipe welder is described wherein an annular evacuated chamber is positioned about the pipe seam to be welded and an annular traveling electron beam accurately follows the seam and produces the weld. The electron beam is a bent column device for minimizing gun contamination and also for space saving purposes; a unique cabling system for controlling and operating the electron beam also is described. The method for welding with the described apparatus is set forth to illustrate a preferred operation.

BACKGROUND OF THE INVENTION

In the welding of pipe for pipelines the existing method involves elaborate manual steps which are not only time consuming but also unpredictable because of its susceptibility to weather conditions. The manual weld of, for instance, a standard 3/8 inch thick pipe with a 30-inch outside diameter consists of various welding steps. The first step is called the "stringer bead," the second is called the "hot pass," the third is referred to as a "filler weld pass" and the last is called the "cover pass." Of these weld passes the stringer bead and the hot pass must be performed within a fixed time period from one another, say about 5 minutes, in order to preserve the metallurgical characteristics of the weld zone. The stringer bead weld pass occurs in the root of the pipe joint and is sufficiently strong to support the pipe. Before the hot pass is applied a grinder operation which also needs to be manually performed, removes and cleans the stringer bead weld area to allow the hot pass to be placed upon clean material. Each of these weld passes requires several welders each of which will take several minutes to perform his task.

The expertise of the manual welders is significant indeed to permit the formation of these annular welds with the varying weather conditions and with the complicated overhead welding required for the portions of the seam at the bottom of the pipe. Nevertheless no additional pipe can be added until the stringer bead and the hot pass welds have been made and the fastest rate that a pipe can be laid depends entirely upon the speed with which these welds can be made. Accordingly, top quality welders are employed to perform the stringer bead and hot pass welds. Also, it is customary to utilize for a 30-inch pipe a team of welders each of whom is responsible for a particular segment of the weld seam. Thus for one stringer bead, there may be some 3 welders operating at the same time. The discontinuities associated with this manual process could adversely affect the weld quality as opposed to producing a continuous weld from an automatic process. It is understandable that with the multitude of manual welding involved the reliability of the weld seams cannot approach that of automatic welding. Furthermore, the numerous passes necessary to perform the filler weld and the cover pass require that the entire welding operation be spread over a considerable distance thereby exposing a substantial section of the pipe in the trench at any one time. Also, the uncertainties involved in the utilization of manual welders requires that the various welding group operations be separated in time and space to accommodate variations in the welding progress made by these separate welding groups. Inspection of the final completed weld further extends the entire welding operation which may become spread out over a distance as much as 15 miles. On the other hand, if single-pass welds could be produced at the head of the line and thereby reduce the distance of spread of the exposed portion of the line to several hundred yards many advantages would be obtained. For instance the scheduling of work and estimation of costs could be done much more precisely. Furthermore, a significant improvement in the laying of safe pipes can be expected.

Electron beam welding as performed in accordance with the process described in the Steigerwald Patent 2,987,610 provides a unique welding method for accomplishing a pipeline weld with a single pass. As described in this patent assigned to this same assignee, the electron beam upon reaching a predetermined power density will penetrate the entire workpiece, the thickness of the pipe, and permit the welding thereof without the requirement of several passes. The heat imparted to the workpiece by the electron beam is of such intensity and so geometrically controlled that the rate of welding lends itself advantageously to the laying of pipe.

The use of an electron beam for welding with sealed localized evacuated chambers has become known in the art. Note for instance U.S. Patent 3,301,993 where a localized vacuum is produced immediately beneath the beam. However, the pipes considered for welding do not have smooth surfaces and do not lend themselves suitably for a sliding seal arrangement between the pipe and the electron beam welder. Also the environment in which these welds must be made is far removed from laboratory or even factory conditions. Picture for instance, the effect the desert sand of New Mexico, the salt air adjacent oceans and the varied terrains will have on sliding seals that must maintain vacuum of $10^{-4}$ torr.

On the other hand it has recently been found useful and practical to employ a fixed non-movable chamber with seals placed between it and large pipe for producing the desired vacuum.

SUMMARY OF INVENTION

It is therefore an object of this invention to provide an annular apparatus and a method for welding large pipe with a beam of charged particles.

It is a further object of this invention to provide an apparatus for welding pipe with a beam of charged particles wherein the beam of charged particles is placed in an evacuated annular chamber which is in sealed relationship with the pipe and travels in an annular fashion relative to the pipe to perform the desired work.

It is still further an object of this invention to provide a unique device for operating and controlling a beam of charged particles placed in an evacuated apparatus.

DESCRIPTION OF THE PREFERRED EMBODIMENT

In the accomplishment of the objects mentioned heretofore, the following figures showing the invention in a preferred embodiment are described.

FIGS. 4 and 4A illustrate the seam follower used in this embodiment.

Figure 1:
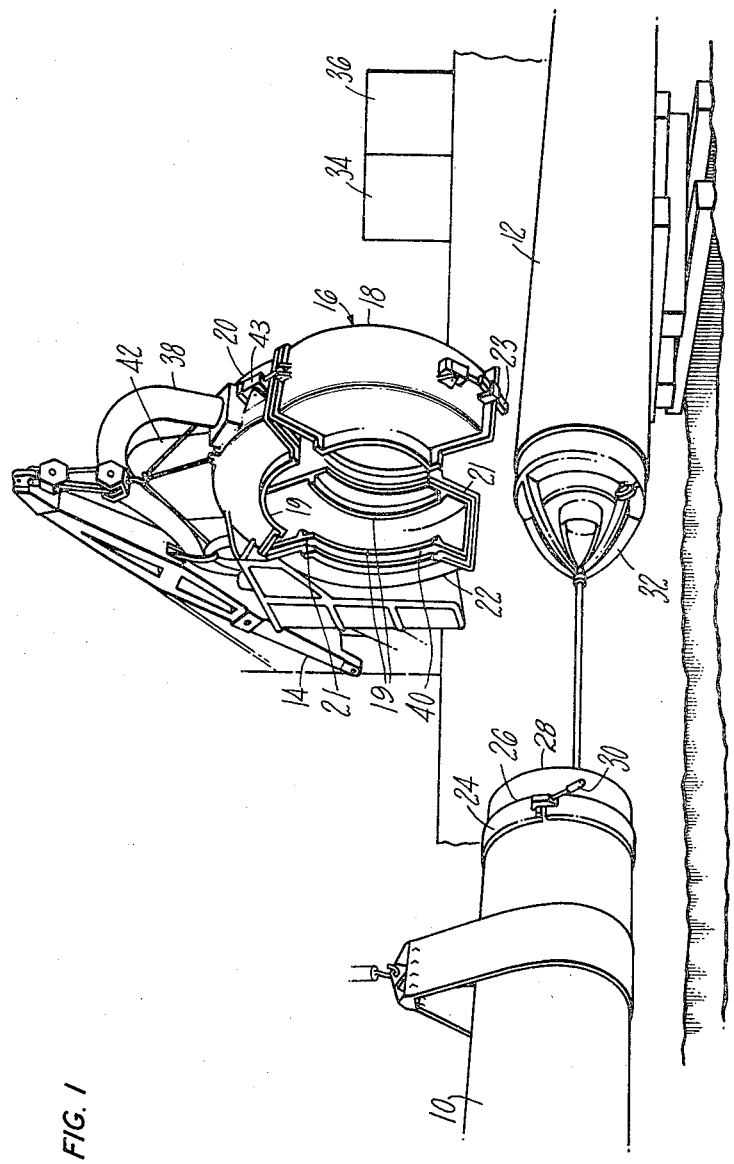
FIG. 1 illustrates the field use of this invention when the pipe is being laid and welded.

In FIG. 1 a pipe section 10 is to be joined to the already laid pipe 12. The pipe 10 is supported from a vehicle employing a conventional boom supporting mechanism. The boom may be mounted on a vehicle 14 or separate therefrom as the case may be. An annular electron beam chamber structure 16 is supported from the vehicle 14. The chamber 16 is split into three compartments or segments, 18, 20, and 22. These are hingeably connected together to form an annular chamber and when connected form a central hole adapted to fit about the pipes 10 and 12. Although the electron beam annular chamber 16 is shown broken into three sections it could be split into half. The use of a fixed third compartment such as 20 provides a parking arrangement for the electron beam apparatus when the chamber is not in use and reduces scuffing of the seals. The third compartment is so sized that it substantially encloses the electron beam apparatus when that is to be parked therein.

The pipe 10 includes at the time of welding a chamber locating ring 24. The function of this ring is to space its edge 26 a known distance from the end 28 of pipe 10. This may be accomplished by providing levers 30 on each of the three sections on which the locating ring is made. Each of these levers 30 has a lip for catching the edge 28 of the pipe 10 to space the ring the distance equivalent approximately to the length of the lever. Since the center of the electron beam apparatus within the annular chamber 16 is known the spacing of the locating ring and the length of the levers 30 is made accordingly so that the snug positioning of the entire chamber 16 to the edge 26 of the locating ring permits the location of the electron beam within deflectable limits of the welding seam.

Internal to the pipe 12 is positioned an alignment clamp and seal 32. This device has both the function of rounding the edges of the pipe 12 and 10 for proper mating thereof as well as providing proper vacuum sealing of a small chamber directly below the welding seam 74. The clamping features of the device 32 are not shown in detail since they do not form part of this invention.

Figure 2:
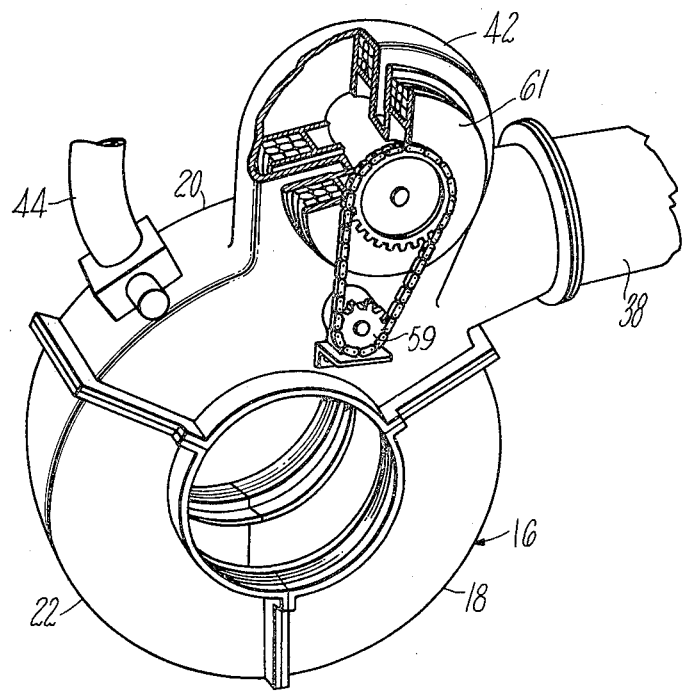
FIG. 2 illustrates the annular pipe welding chamber for the traversing electron beam and the cable feed mechanism for controlling and operating the electron beam.
Figure 3:
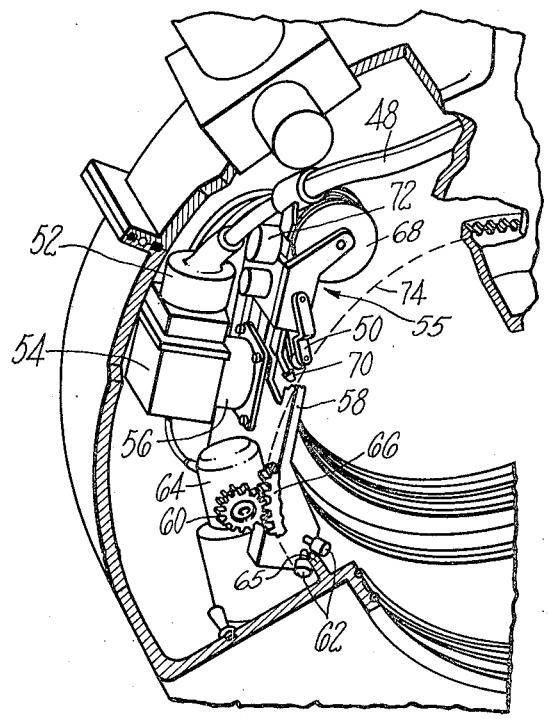
FIG. 3 illustrates the traversing mechanism of the electron beam in more detail.

The annular chamber 16 has its compartments shaped to contain an annular traveling electron beam apparatus as set forth in more detail in FIGS. 2 and 3. On the vehicle 14 are a power supply 34 and vacuum producing equipment 36. The power supply and the vacuum equipment are well known devices and therefore are not shown in detail. A vacuum hose 38 is illustrated to be connected from the vehicle 14 to the annular chamber 16.

The three equal compartments of the chamber 16 provide a fixed compartment to which the vacuum and control access means may be permanently attached with suitable flanges. The three segmented chamber 16 will close such that minimum scuffing of the seals 40 on the inner surfaces of the chamber 16 will occur. As illustrated in FIG. 1 dual seals are employed in the pipe facing walls 19 of the chamber 16 and walls 21 of the segments facing one another. The two movable compartments 18 and 22 are fastened to the upper compartment 20 by hinges which are actuated by trunnion mounted power cylinders 43. The hinge compartments are secured in place on the pipes 10 and 12 by a quick latching power actuated lock 23. The volume enclosed by the chamber 16 and the pipes 10 and 12 will be evacuated to a hard vacuum, approximately $10^{-4}$ torr, the pressure required for operating an electron beam gun. The operator console may be attached to the vehicle 14 and coupled to the gun in the chamber through a cable mechanism.

In FIGS. 2 and 3 the chamber 16 assembly as well as the electron beam gun and carriage assembly are illustrated in greater detail. The chamber 16 is shown with the compartments 18 and 22 locked and in fixed sealed relationship with compartment 20. An electron beam gun carriage assembly 58 is illustrated to be rotatably mountable inside the chamber 16. The carriage supports a seam follower 50, an electron gun of the bent column type 52, a wire feeder 55, and driving means 64 for driving the entire carriage assembly around the periphery of the chamber 16. A continuous or unbroken cable 48 is coupled to a reel mechanism 42 for supplying both the power and control of the carriage assembly and welding operation inside the chamber.

Figure 7:
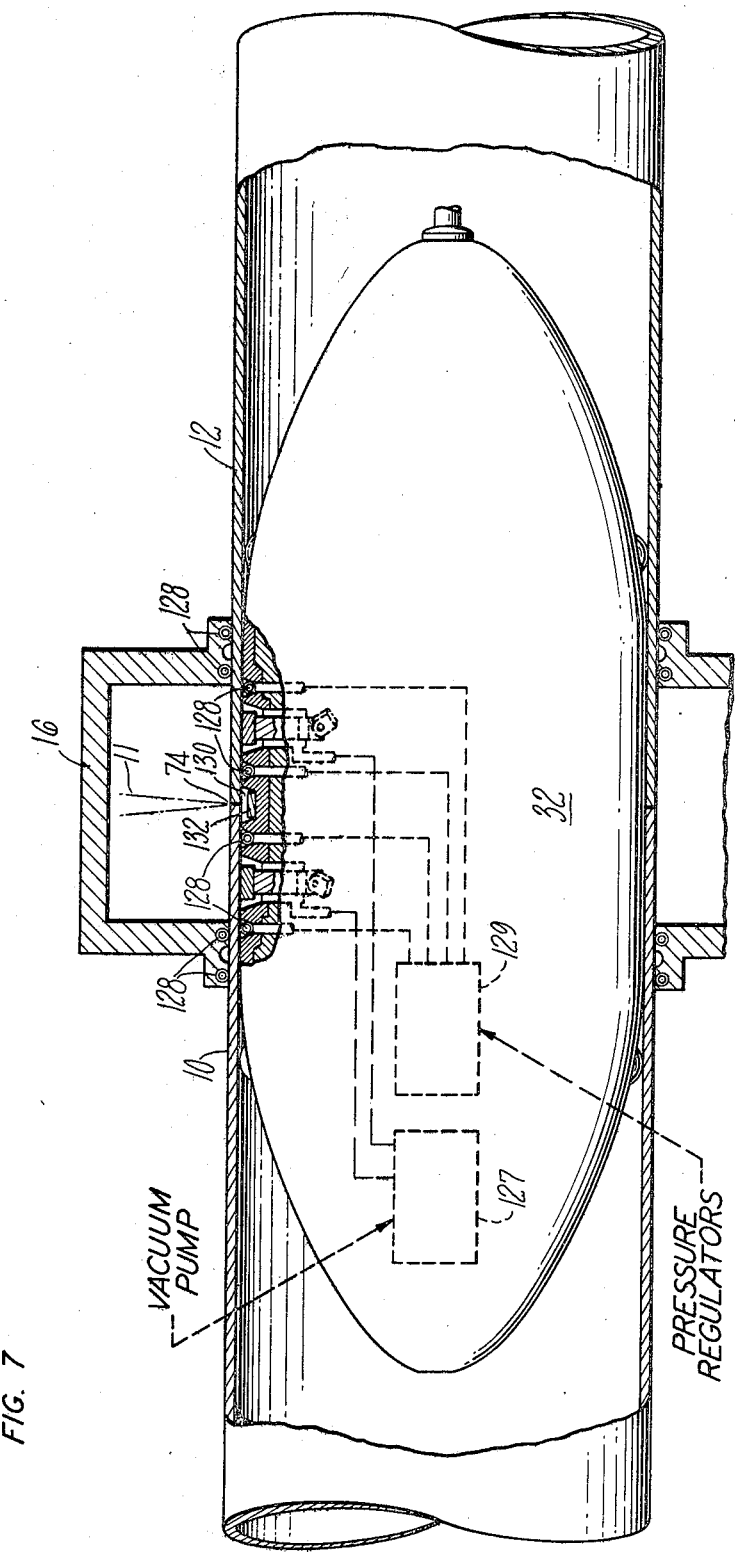
FIG. 7 illustrates the sealing mechanism on the inside of the pipe.

The reel mechanism 42 includes a reel drive 59 for rotating the reel 61 in both directions for either paying out or retrieving of the cable 48 in concert and coordination of the traveling electron beam carriage assembly. The driving mechanism 59 may be by conventional electric motor which by appropriate electronic control means senses the direction of movement of the carriage assembly to turn the reel 61 in the appropriate direction. The tube 38 provides the coupling means between the chamber 16 and the diffusion pump on the vehicle 14 for evacuating the chamber to the desired pressure levels. A hard point 44 for supporting the entire assembly 16 is provided. Further detail in FIG. 3 shows the electron beam gun 52 which is well known in the art as described in the patent to Steigerwald 2,987,610. The beam gun 52 is further provided with bending means, electromagnetic deflection coils in the housing 54, for bending the beam at 90° from the original axis and directing the beam at the pipe seam to be welded. The final direction of the electron beam is substantially radial with respect to the pipe axis. The bent column feature may be for instance as illustrated in FIG. 7 of the patent Opitz et al. 2,944,172. The beam column in this invention is bent a full 90° to conserve space and to minimize contamination of the electron beam gun. Below the electron beam bending apparatus 54 is a lens housing 56 for focusing of the electron beam. Again this lens is conventional so that the electron beam may be focused as desired above or below the seam.

The entire electron beam gun assembly is mounted on a movable carriage 58. This carriage moves on axially spaced annular rails 65. Guide rollers 62 are positioned on both sides of the rails 65 to radially support the entire carriage as it moves around the periphery of the chamber 16. An electric motor 64 with a drive gear 60 in meshing relationship with an annular rack gear 66 provides positive smooth uninterrupted and bidirectional motion of the carriage 58. A positive drive mechanism is provided to maintain the entire carriage in the parked position. Each compartment of the chamber contains continuous sections of the rack gear and rails to permit continuous peripheral motion. Since the supporting rails must be continuous and yet be capable of segmenting when the chamber 16 is unlocked, the compartments 18, 20 and 22 share portions of the rails, with the portions meshing with one another by careful alignment when the chamber 16 is closed.

In order to provide fully automated welding a seam follower 50 is also mounted on a carriage 58. The seam follower 50 is described in more detail in relation to FIG. 4 and is also supported on the carriage 58. The wire feeder 55 (FIG. 3) comprises a reel 68 containing a supply of the filler wire and supplies this through tube 70. Feed of the wire from the reel 68 is controlled by a suitable mechanical linkage or electrical arrangement operating in synchronization with the traversal of the entire carriage 58 relative to the seam 74. Such control systems are well known as shown in U.S. Patents Nos. 3,035,156 and 3,165,619. The wire feeder is mounted with the seam tracker on a subassembly (FIG. 4) which is in turn pivotally mounted on the carriage 58. With this arrangement the wire is always fed at the proper point on the seam. A saparate transducer 72 is provided for producing a signal commensurate with the amount of the pivot of the sub assembly and deflect the electron beam accordingly. Electron beam deflection may be done by conventional electromagnetic coil deflection means mounted in the housing 56 containing the focusing coil. Below the lens coil housing 56 is a valve (not shown which is closed when the entire chamber 16 is disengaged from the pipes and the individual compartments are not locked together to protect the gun assembly from dirt, moisture and other contaminants.

In FIGS. 4 and 4A the seam tracker is illustrated in greater detail. The seam tracking wheel 76 is rotatably mounted between members 78 and positioned to roll along the seam 74. Arms 78 extend from a platform 80 which is pivotally mounted to carriage 58 at pivot point 81. This platform 80 supports the wire feed mechanism and is mechanically coupled to the wiper arm 82 of a potentiometer 84 mounted on the carriage 58. The potentiometer 84 is one embodiment of the transducer 72 shown in FIG. 3. The voltage output taken from wiper arm 82 is then applied through a conventional amplifier to the beam deflection coils. The terminals of the potentiometer 84 are respectively coupled to negative and positive voltage supplies through other voltage controlling potentiometers 86 and 88 respectively. Spring means concentric with the pivot 81 urge the wheel 76 towards the surface of the pipes regardless of the annular position of the carriage. In addition, a rocker arm 91 is pivotally mounted relative to the platform 80 although coupled thereto by means of compressible springs 93 and 95. A clockwise rotation of the rocker arm 91 about pivot point 81 compresses spring 93 and a counterclockwise rotation compresses spring 95. Extension arms 90 and 92 are provided each of which is pivotably mounted to the rocker arm 91 at points 94 and 86 in such manner for the travel of the seam tracking wheel 76 in a clockwise direction these arms present a fixed extension of the rocker arm 91 in contact with the cams 108 and 106 via cam followers 102 and 104. The springs 98 and 100 are in tension and tend to urge the extension arms 90 and 92 in their fixed position.

The surfaces of the cams 106 and 108 are provided with raised surfaces 110 and depressed surfaces 112 and the cams which are annularly placed in the side walls of the compartments of the chamber 16 are offset with respect to one another so that the transition from a raised to a depressed surface are not encountered by the rollers 102 and 104 at the same time as the entire mechanism travels in a clockwise direction.

It can thus be seen that as the seam tracker travels in a clockwise direction the seam tracker wheel 76 will sweep across the surfaces of the pipes 10 and 12 in an axial direction seeking the seam 74. When it encounters the seam some additional force will be needed to drive the wheel through the seam 74 and this force will be applied by the rocker arm 91 and its extension 90 and 92. However, the springs 93 and 95 will have sufficient resilience to compress and take up this additional force from the cam followers and prevent the seam tracking wheel from being forced out of the seam after this has been located.

A variable search range of the seam tracker arrangement is provided by gradually changing the magnitude of the transitions on the cams as the seam tracker traverses the seam in the clockwise direction. Upon the initiation of the welding cycle the seam tracker travels in a counterclockwise direction and as the extension arms 90 and 92 encounter raised portions of the cams the pivoting mounts 94 and 96 permit the arms to fold back. The pivoting points 94 and 96 and the pivoting points of the springs 98 and 100 are so adjusted that upon the counter rotation of the seam tracker for welding, the springs allow the extension arms to pivot away from the cams surfaces. If required, by a simple hand lever means (not shown) the extension arms may be made to reengage the cams surfaces. Prealignment of the beam with the seam tracker may be done with conventional alignment means by adjustment of potentiometers 86 and 88.

Upon the initiation of the welding cycle any deviation of the seam tracker from the seam position is sensed by are arm 82 and potentiometer 84 and the signal is applied to the deflection coils of the electron beam to produce a corresponding deflection thereof. By placing the roller 76 close to the impingement point of the electron beam 11 a memory device compensating for the small distance between the actual welding point and the seam tracker's indication of the seam position point will not be necessary. Abrupt variations of the seam are not expected.

Figure 5:
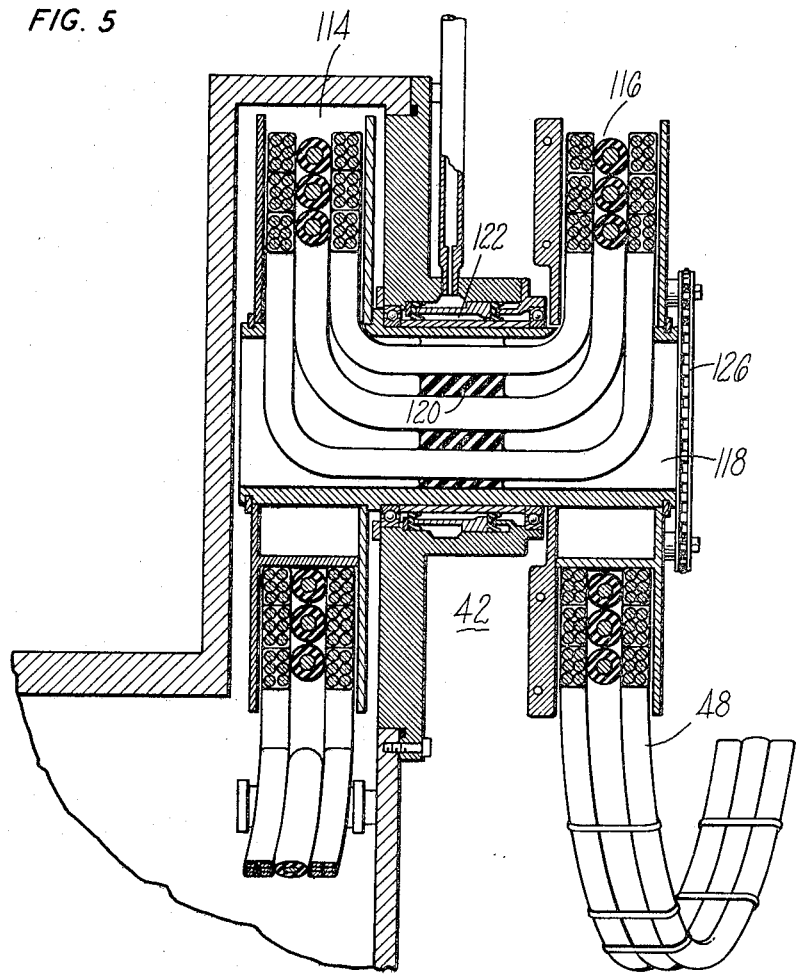
FIGS. 5 and 6 show the reel mechanism for supplying the power and control to the traversing electron beam within the evacuated chamber.
Figure 6:
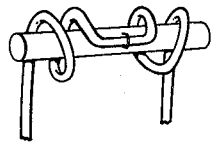

The power required to operate the electron beam gun as well as the carriage 58 and the associated components is supplied through a double reel system shown in FIG. 5. The reel assembly 42 is located in the fixed compartment 20 of the chamber 16 as illustrated in FIG. 1. The continuous cable 48 includes the high voltage lead in and the control cables and is introduced into the chamber 14 by a unique but simple double reel device. A first compartment 114 is provided which is in communication with the evacuated portion of the chamber 16. A second compartment 116 in contact with the ambient is provided and both compartments 114 and 116 are coupled through a passage 118. This passage 118 is the hollow axle of the reel 42 and provisions are made to allow the cable 48 to enter this axle from both compartments 114 and 116. Inside the passage 118 the coaxial cable 48 is hermetically sealed to the walls of the passage by a suitable compound 120. Since both compartments 114 and 116 jointly rotate a rotatable seal 122 is provided. The rotatable seal may be of the double seal type with the space in between at least partially evacuated to assure minimum leakage and permit the maintenance of a higher vacuum inside the entire chamber 16. The cables 48 are wound on the reels in the compartments 114 and 116 in such a manner that they wind and unwind simultaneously. FIG. 6 illustrates how the cables are wound. As shown in FIG. 6 the cable 48 need not communicate between compartments 114 and 116 through the hollow shaft passage 118 but could be wound outside it, provided a hermetic seal between the compartments is maintained. The winding of the continuous cables is important to eliminate twisting of the cables as the electron beam traverses around the periphery of the pipe and most significantly eliminates the requirement of sliding electrical contacts. As the inside portion of the cables 48 in compartment 114 is paid out a similar paying out of the external cable in compartment 118 will occur. Similarly when the inside cable is retrieved the outside portion is also retrieved. As illustrated in FIG. 2 a constant torque motor 59 is utilized on the reel via a drive sprocket 126 to maintain constant tension for rewinding of the cable during the welding cycle. The takeup torque on the motor 59 will be just sufficient to retrieve the paid out cable but not provide any positive drive that might disturb the traversal of the electron beam around the pipe.

As illustrated in FIG. 1 an alignment clamp 32 is positioned inside pipe 12 and has a front end portion for receiving the pipe segment 10 to be welded to the pipeline 12. In FIG. 7 a schematic representation of the arrangement during the welding process is shown. The chamber 16 straddles the pipes 10 and 12 and of course the seam 74 with an annular evacuated environment. The alignment tool 32 is provided with several sealing means on the inside of the pipe to complete the evacuated annular chamber. Both the chamber 16 and the sealing means in the alignment tube contain inflatable seals 128. The seals on the outside of the pipes 10 and 12 are pressurized from a source originating from the vehicle 14. The seals on the inside of the pipe in the alignment tool are pressurized from a pressure source inside the tool (not shown). Immediately under the seam 74 is a small recess 130 and an expendable, sacrificial ring 132. Adjacent to the recess 130 are inflatable seals 128 and spaced therefrom a sufficient distance to prevent them from being affected by the high temperatures encountered when welding. On both sides of the seam 74 are clamping mechanisms arranged in an annular fashion to aid in the rounding of the pipe 10 and 12 as well as to maintain their relative positions during the welding operation. The clamping means are not a part of this invention and therefore are not set forth in greater detail. Since the abutting edges of the pipe 10 and 12 along the seam 74 do not completely mate with one another the gaps provide passage means communicating between the recess 130 and the chamber 16 and there is no need to pump out the air from the recess 130 by a separate vacuum pumping device. The evacuation of the recess may be relied upon by the pumping mechanism active on the chamber 16 and affecting the recess 130 through the various gaps between the abutting surfaces of the pipes.

Differential pumping may be provided for obtaining improved sealing between the double seals on each side of the seam 74. Such intermediate pumping which may be accomplished by conventional roughing pumps rather than expensive diffusion pumps will aid in the maintenance of a high vacuum within the annular chamber. The sacrificial ring 132 is easily separable from the alignment clamp and its function is to absorb any protruding electron beams through the seam 74 that would otherwise destroy underlying portions of the alignment tool 32. The ring is a low cost item which may easily be changed.

The sealing arrangement between the chamber compartments 18, 20 and 22 as well as between them and the pipe comprises a novel combination of inflatable and flat seals. The pipe facing walls of the compartments are provided with inflatable seals and the walls facing adjacent compartments are provided with flat noninflatable seals.

In the operation of the electron beam pipe welder the edges of the pipes to be joined are cleaned to remove excessive oil, rust or dirt and the outside edges of the pipes are provided with a small bevel to accommodate the seam follower. This pipe can be manufactured with a bevel. In the meantime the locating ring 24 is properly spaced from the edge of the pipe 10 after which the pipe 10 is fitted over the alignment tool 32 and made to abut the edge of pipe 12.

At this time the clamping tool performs its function of rounding the pipe 12. Thereupon the three compartmented chamber 16 is lowered over the seam 74 and positioned adjacent the edge 26 of the locating ring 24 so that thereby the seam will be within deflectable limits of the electron beam. Inflatable seals of the chamber 16 as well as those actuating on the inside of pipe 10 are pressurized and the compartments are firmly clamped together. The electron gun and the carriage assembly are located within the fixed segment 20 and the working cycle is commenced with a pretravel movement around the periphery of the pipe both for paying out the cable 48 and to seek and track the seam 74 with the seam follower. The chamber 16 is being pumped while the carriage assembly performs its pretravel cycle, thus saving time and upon completion of the pretravel step the entire system is ready for the weld pass. Appropriate controls for the electron gun are actuated upon the reaching of the desired vacuum and the location of the beam upon the seam as controlled by the seam follower so that the welding operation in accordance with the teachings of the welding process described in the patent to Steigerwald 2,987,610 can be commenced. As the beam welds the seam it may be deflected in circular fashion to aid in the circulation of the filler material throughout the fusion zone to obtain a high quality weld.

It can thus be seen that a unique electron beam pipe welding apparatus is provided to perform the entire welding operation with a single weld pass. The associated advantages both in economy as well as reliability and safety are quite significant. The advantages of eliminating sliding electrical contacting devices for communicating from outside to inside of the evacuated chamber greatly enhances the utility of the pipe welder device.

The novel apparatus may also be employed to perform the welding of large pipes from the inside. In such event there is no need to segment the chamber 16. The novel features of this invention may then be employed to advantageously weld with an orbiting beam of electrons.

It is to be understood that the invention is not limited to the specific embodiment herein illustrated and described but may be used in other ways without departure from its spirit as defined by the following claims.

I claim:

1. In combination with a sealed chamber having walls enclosing a movable beam generator for working materials, the improvement comprising:
   a shaft member extending through and rotatably journaled with one of the chamber walls and having projecting ends extending from each side of the one wall;
   rotatable sealing means interposed between the shaft member and the one wall, the sealing means including a stationary element fixed to the one wall and a rotatable element fixed to the shaft member;
   cabling means having end portions wound upon each of the projecting ends of the shaft member and having an interconnecting portion extending between the end portions and through the rotatable element of the sealing means, the end portion of the cabling means within the chamber being coupled to the movable beam generator;
   means for rotating the shaft member for retrieving or paying out the end portions of the cabling means in coordination with the movement of the beam generator within the chamber.

2. The combination of claim 1 wherein:
   the shaft member is a hollow shaft having an external cylindrical surface;
   the interconnecting portion of the cabling means extends through the hollow shaft;
   the stationary element of the sealing means engages the external cylindrical surface of the shaft member; and
   the rotatable element of the sealing means surrounds the interconnecting portion of the cabling means and seals the cabling means within the hollow shaft.

3. The combination of claim 2 wherein:
   the stationary element includes axially spaced first and second seals engaging the cylindrical surface of the shaft; and
   means are provided for evacuating the space between the axially spaced first and second seals.

4. In combination with a closed vacuum chamber containing an electron beam generator movable within the chamber for working materials, the improvement comprising:
   a rotatable reel assembly including a hollow, central member projecting through a wall of the chamber and rotatably mounted to the wall, an inner reel supported on the end of the central member within the chamber and an outer reel supported on the end of the central member outside of the chamber;
   a cable having a first portion wound upon the inner reel and connected to the movable beam generator, a second portion wound upon the outer reel and a central portion passing through the hollow central member between the first and second portions;
   a sliding vacuum seal interposed between the wall and the rotatable central member,
   a fixed vacuum seal extending between and in sealing contact with the central portion of the cable and the hollow central member; and driving means for rotating the reel assembly in conjunction with the movement of the beam generator.

5. The combination of claim 4 wherein the first and second cable portions are wound in the same direction whereby rotation of the reel assembly simultaneously pays out or retrieves the cable portions on each of the reels.

References Cited

UNITED STATES PATENTS

| | | | |
|---|---|---|---|
| 2,972,667 | 2/1961 | Ryder | 191—12.2 |
| 3,035,156 | 5/1962 | Staley | 219—125 |
| 3,084,246 | 4/1963 | Rieppel et al. | 219—60.1 |
| 3,119,009 | 1/1964 | Zeller | 219—125 |
| 3,120,355 | 2/1964 | Bowman | 191—12.2 |
| 3,165,619 | 1/1965 | Cohen | 219—121 |
| 3,194,936 | 7/1965 | Rohrberg et al. | 219—60.1 |
| 3,219,792 | 11/1965 | Pederson | 219—121 |
| 3,301,993 | 1/1967 | Boyd et al. | 219—121 |
| 3,374,319 | 3/1968 | Stahmer | 191—12.4 |
| 3,409,752 | 11/1968 | Henderson et al. | 219—60.1 |

JOSEPH V. TRUHE, Primary Examiner

W. DEXTER BROOKS, Assistant Examiner

U.S. Cl. X.R.

219—60